(12) United States Patent
  Suganuma et al.

(10) Patent No.: US 12,617,356 B2
(45) Date of Patent: May 5, 2026

(54) WIRE HARNESS

(71) Applicant: YAZAKI CORPORATION, Tokyo (JP)

(72) Inventors: Hiroki Suganuma, Makinohara (JP); Mitsuhisa Sano, Makinohara (JP); Shuji Kimura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 228 days.

(21) Appl. No.: 18/746,009

(22) Filed: Jun. 17, 2024

(65) Prior Publication Data

US 2025/0018883 A1    Jan. 16, 2025

(30) Foreign Application Priority Data

Jul. 13, 2023    (JP) ................................. 2023-114950

(51) Int. Cl.
  *B60R 16/02*     (2006.01)
  *G01B 7/06*     (2006.01)
  *H01B 7/00*     (2006.01)

(52) U.S. Cl.
  CPC ...... *B60R 16/0215* (2013.01); *B60R 16/0207* (2013.01); *G01B 7/08* (2013.01); *H01B 7/0045* (2013.01)

(58) Field of Classification Search
  CPC ............ B60R 16/0207; B60R 16/0215; H01B 7/0045; H01B 7/08
  See application file for complete search history.

(56) References Cited

U.S. PATENT DOCUMENTS

| | | | | |
|---|---|---|---|---|
| 4,065,199 | A * | 12/1977 | Andre ...................... | H01B 7/08 |
| | | | | 174/72 A |
| 2013/0189868 | A1* | 7/2013 | Fitt .......................... | F02C 7/32 |
| | | | | 439/272 |
| 2017/0085041 | A1* | 3/2017 | Zhang ................ | H01R 13/7175 |
| 2019/0126863 | A1* | 5/2019 | Naganishi ........... | B60R 16/0238 |
| 2023/0040596 | A1* | 2/2023 | Park ...................... | G06F 1/1683 |

FOREIGN PATENT DOCUMENTS

| | | |
|---|---|---|
| JP | H05-21927 A | 1/1993 |
| JP | 2001-189577 A | 7/2001 |
| JP | 2007-150047 A | 6/2007 |
| JP | 2008-287918 A | 11/2008 |

* cited by examiner

*Primary Examiner* — Paresh Paghadal
(74) *Attorney, Agent, or Firm* — KENEALY VAIDYA LLP

(57) ABSTRACT

A wire harness includes a trunk module including a plurality of flexible printed circuit boards, a plurality of trunk connectors, and a first wiring member module connecting the plurality of flexible printed circuit boards to each other, and a plurality of branch modules each including a plurality of branch wiring members and a branch connector provided at ends of the plurality of branch wiring members and connected to one of the trunk connectors. Each of the plurality of flexible printed circuit boards is provided with a wiring pattern including a plurality of conductor circuit portions electrically connected to the plurality of branch wiring members, respectively, via the trunk connectors and the branch connectors to constitute transmission paths, and joint portions each connecting at least two of the plurality of conductor circuit portions to each other.

8 Claims, 5 Drawing Sheets

WIRE HARNESS

CROSS-REFERENCE TO RELATED APPLICATION(S)

The present application claims priority to and incorporates by reference the entire contents of Japanese Patent Application No. 2023-114950 filed in Japan on Jul. 13, 2023.

BACKGROUND OF THE INVENTION

1. Field of the Invention

The present invention relates to a wire harness.

2. Description of the Related Art

As a conventional technique related to wire harnesses, for example, Japanese Patent Application Laid-open No. 2007-150047 A discloses a wire harness provided with a trunk module including flexible printed circuit boards having flexibility and a plurality of trunk connectors provided at ends of the flexible printed circuit boards.

The wire harness described in the above-described Japanese Patent Application Laid-open No. 2007-150047 A, however, has room for further improvement in terms of, for example, ease of assembly to a vehicle or the like.

SUMMARY OF THE INVENTION

The present invention has been made in view of the above circumstances, and an object thereof is to provide a wire harness capable of improving ease of assembly to a vehicle or the like.

In order to achieve the above mentioned object, a wire harness according to one aspect of the present invention includes a trunk module including a plurality of flexible printed circuit boards having flexibility, a plurality of trunk connectors provided at ends of the plurality of flexible printed circuit boards, and a first wiring member module including a plurality of trunk first wiring members having conductivity and connecting the plurality of flexible printed circuit boards to each other; and a plurality of branch modules each including a plurality of branch wiring members having conductivity, and a branch connector provided at ends of the plurality of branch wiring members and connected to one of the trunk connectors, wherein each of the plurality of flexible printed circuit boards is provided with a wiring pattern including a plurality of conductor circuit portions electrically connected to the plurality of branch wiring members, respectively, via the trunk connectors and the branch connectors to constitute transmission paths, and joint portions each connecting at least two of the plurality of conductor circuit portions to each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
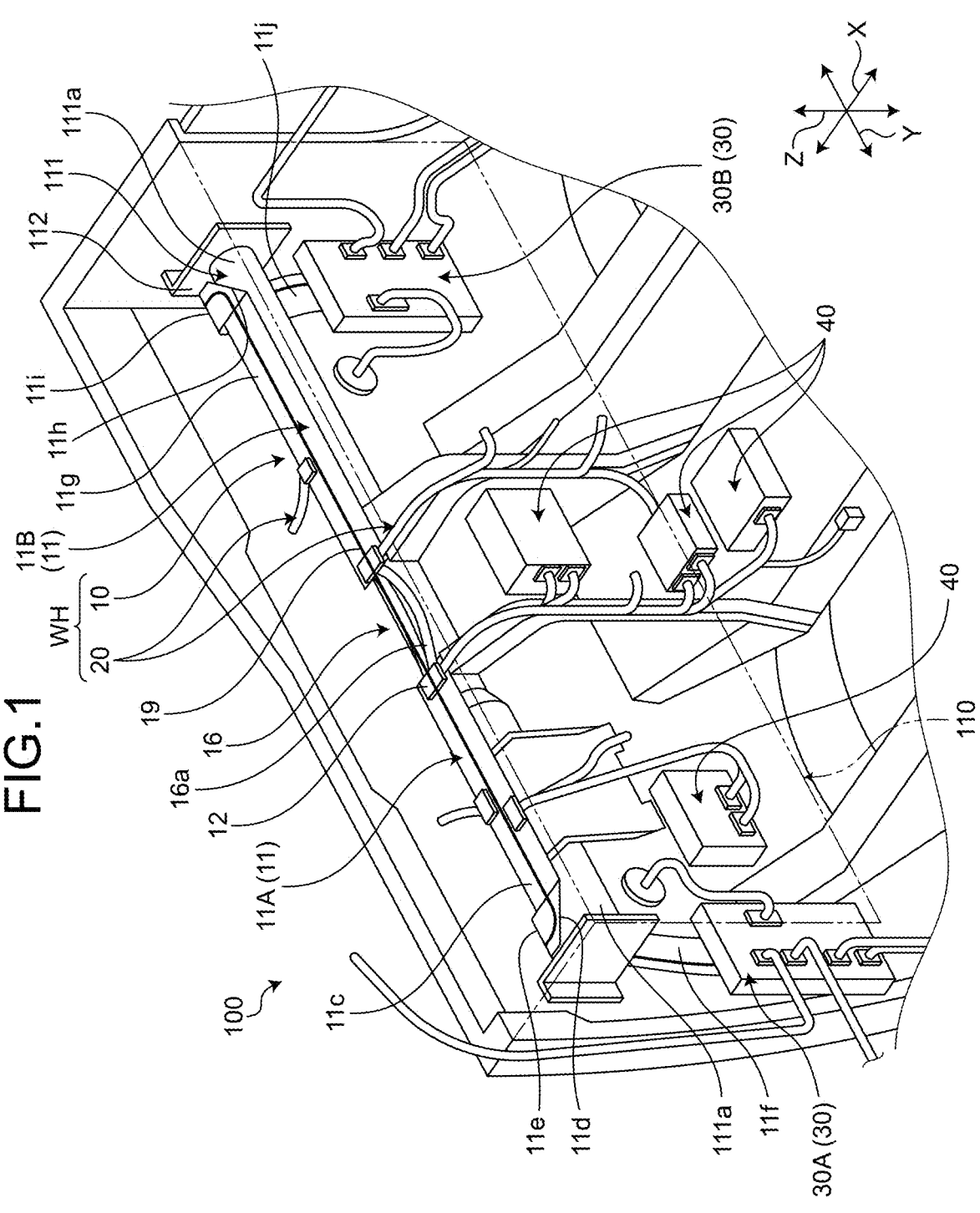
FIG. 1 is an exemplary perspective view of a vehicle for which a wire harness according to an embodiment is used.

An embodiment and a modification of the present invention will be described in detail hereinafter with reference to the drawings. Note that the present invention is not limited by the following embodiment and modification. In addition, components in the following embodiment and modification include ones that can be easily replaced by those skilled in the art and ones that are substantially the same.

In addition, the embodiment and modification disclosed below include similar components. In the following description, therefore, such similar components will be given the same reference numerals, and redundant description thereof is omitted. Note that ordinal numbers are used only to distinguish components, members, parts, positions, directions, and the like, and do not indicate order or priority.

Embodiment

FIG. 1 is a perspective view of a vehicle 100 for which a wire harness WH according to an embodiment is used. Note that in the following description, a first direction, a second direction, and a third direction, which intersect one another, will be referred to as an "extending direction Y", a "depth direction X", and a "height direction Z", respectively. Here, the extending direction Y, the depth direction X, and the height direction Z are substantially perpendicular to one another. The extending direction Y typically corresponds to a longitudinal direction of a trunk module 10 of the wire harness WH, a vehicle width direction, and the like. The depth direction X corresponds to a lateral direction of the trunk module 10 of the wire harness WH, a vehicle length direction, and the like. The height direction Z corresponds to a thickness direction of the trunk module 10 of the wire harness WH, a vehicle vertical direction, and the like. In addition, each direction used in the following description will be described as a direction in a state where the wire harness WH is assembled to the vehicle 100 unless otherwise specified.

The wire harness WH in the present embodiment illustrated in FIG. 1 is used for the vehicle 100 and used to supply power and communicate signals by connecting apparatuses mounted on the vehicle 100. The wire harness WH in the present embodiment is attached to, for example, a structural member 111 installed inside an instrument panel 110 of the vehicle 100. The instrument panel 110 is an interior panel disposed in a front part of a vehicle interior along the extending direction Y in such a way as to face a driver seat and a passenger seat of the vehicle 100. Note that in FIG. 1, the instrument panel 110 is indicated by an alternate long and two short dashes line. The structural member 111 is, for example, a reinforcement (reinforcing member) or the like formed of a metal hollow pipe and extending along the extending direction Y. Flanges 112 are joined to both ends of the structural member 111. One of the flanges 112 is fixed to a left side of a body of the vehicle 100, and the other flange 112 is fixed to a right side of the body of the vehicle 100.

The wire harness WH includes, for example, the trunk module 10 and a plurality of branch modules 20. The trunk module 10 is a structural module disposed inside the instrument panel 110 of the vehicle 100, or more specifically, on the structural member 111 along the extending direction Y. The trunk module 10 includes, for example, a plurality of flexible printed circuit boards 11, a plurality of trunk connectors 12 provided at ends of the flexible printed circuit boards 11, and a first wiring member module 16 that connects the plurality of flexible printed circuit boards 11 to one another. Here, each of the plurality of flexible printed circuit boards 11 is connected to an ECU 30 via one of the plurality of trunk connectors 12 and also connected to branch modules 20 via other trunk connectors 12. Note that the ECU 30 here is typically a zone ECU that comprehensively controls devices in a peripheral area (zone) of the instrument panel 110, but is not limited to this.

In addition, the plurality of flexible printed circuit boards 11 includes, for example, a first flexible printed circuit board 11A and a second flexible printed circuit board 11B. The first flexible printed circuit board 11A is provided at one end of the trunk module 10 in the extending direction Y and electrically connected to a first ECU 30A, which is an ECU 30, via one of the trunk connectors 12. The second flexible printed circuit board 11B is provided at another end of the trunk module 10 in the extending direction Y and electrically connected to a second ECU 30B, which is another ECU 30, via another of the trunk connectors 12. The first flexible printed circuit board 11A and the second flexible printed circuit board 11B are provided at intervals along the extending direction Y and electrically connected to each other via the first wiring member module 16. Note that the first ECU 30A and the second ECU 30B are disposed separate from both ends 111*a* of the structural member 111 in the height direction Z, which intersects the extending direction Y.

In addition, the first flexible printed circuit board 11A includes, for example, a first portion 11*c*, a plurality of first folded portions 11*d* and 11*e*, and a second portion 11*f*. The first portion 11*c* is a portion of the first flexible printed circuit board 11A disposed on the structural member 111 and extending along the extending direction Y. The second portion 11*f* is a portion of the first flexible printed circuit board 11A connected to the first portion 11*c* via the plurality of first folded portions 11*d* and 11*e* and extending toward the first ECU 30A along the height direction Z. Here, the second portion 11*f* is folded back along the depth direction X at the first folded portion 11*d* with respect to the first portion 11*c* and folded back along the height direction Z at the first folded portion 11*e* toward the first ECU 30A. As a result, the trunk connector 12 (refer to FIG. 2) provided at an end of the second portion 11*f* is bent in such a way as to be connectable (fittable) to a connector of the first ECU 30A, and is electrically and mechanically connected to the connector of the first ECU 30A.

In addition, the second flexible printed circuit board 11B includes, for example, a third portion 11*g*, a plurality of second folded portions 11*h* and 11*i*, and a fourth portion 11*j*. The third portion 11*g* is a portion of the second flexible printed circuit board 11B disposed on the structural member 111 and extending along the extending direction Y. The fourth portion 11*j* is a portion of the second flexible printed circuit board 11B connected to the third portion 11*g* via the plurality of second folded portions 11*h* and 11*i* and extending toward the second ECU 30B along the height direction Z. Here, the fourth portion 11*j* is folded back along the depth direction X at the second folded portion 11*h* with respect to the third portion 11*g* and folded back along the height direction Z at the second folded portion 11*i* toward the second ECU 30B. As a result, the trunk connector 12 (refer to FIG. 2) provided at an end of the fourth portion 11*j* is bent in such a way as to be connectable (fittable) to a connector of the second ECU 30B, and is electrically and mechanically connected to the connector of the second ECU 30B.

The first wiring member module 16 is a wiring module including one end connected to the first flexible printed circuit board 11A and another end connected to the second flexible printed circuit board 11B. The first wiring member module 16 includes, for example, a plurality of trunk first wiring members 16*a* having conductivity and a pair of trunk first connectors 16*b* (refer to FIG. 2) provided at both ends of the plurality of trunk first wiring members 16*a* and connected to the first flexible printed circuit board 11A and the second flexible printed circuit board 11B, respectively. The trunk first wiring members 16*a* are, for example, electric wires each including a conductor portion obtained by intertwining a plurality of linear metal strands and an insulating coating covering the outside of the conductor portion.

The trunk module 10 may include a special electric wire 19 in addition to the first flexible printed circuit board 11A, the second flexible printed circuit board 11B, and the first wiring member module 16. The special electric wire 19 is an electric wire that transmits a signal or power that is difficult to appropriately transmit with the first flexible printed circuit board 11A, the second flexible printed circuit board 11B, the first wiring member module 16, or the like, and is used, for example, to transmit a signal of high-speed communication or large current power. The special electric wire 19 is routed along, for example, the structural member 111.

Each of the plurality of branch modules 20 is a wiring module including one end connected to one of the trunk connectors 12 of the first flexible printed circuit board 11A or the second flexible printed circuit board 11B and other ends connected to various electronic devices 40 in the vehicle 100. Each of the branch modules 20 includes a plurality of branch wiring members 21 (refer to FIG. 2) having conductivity, a branch connector 22 provided at one ends of the plurality of branch wiring members 21 and connected to the corresponding trunk connector 12, and branch connectors 23 provided at other ends of the plurality of branch wiring members 21 and connected to the various electronic devices 40 in the vehicle 100. Each of the plurality of branch modules 20 is routed toward the various electronic devices 40 disposed separate from the first flexible printed circuit board 11A and the second flexible printed circuit board 11B in the height direction Z, which intersects the extending direction Y.

Figure 2:
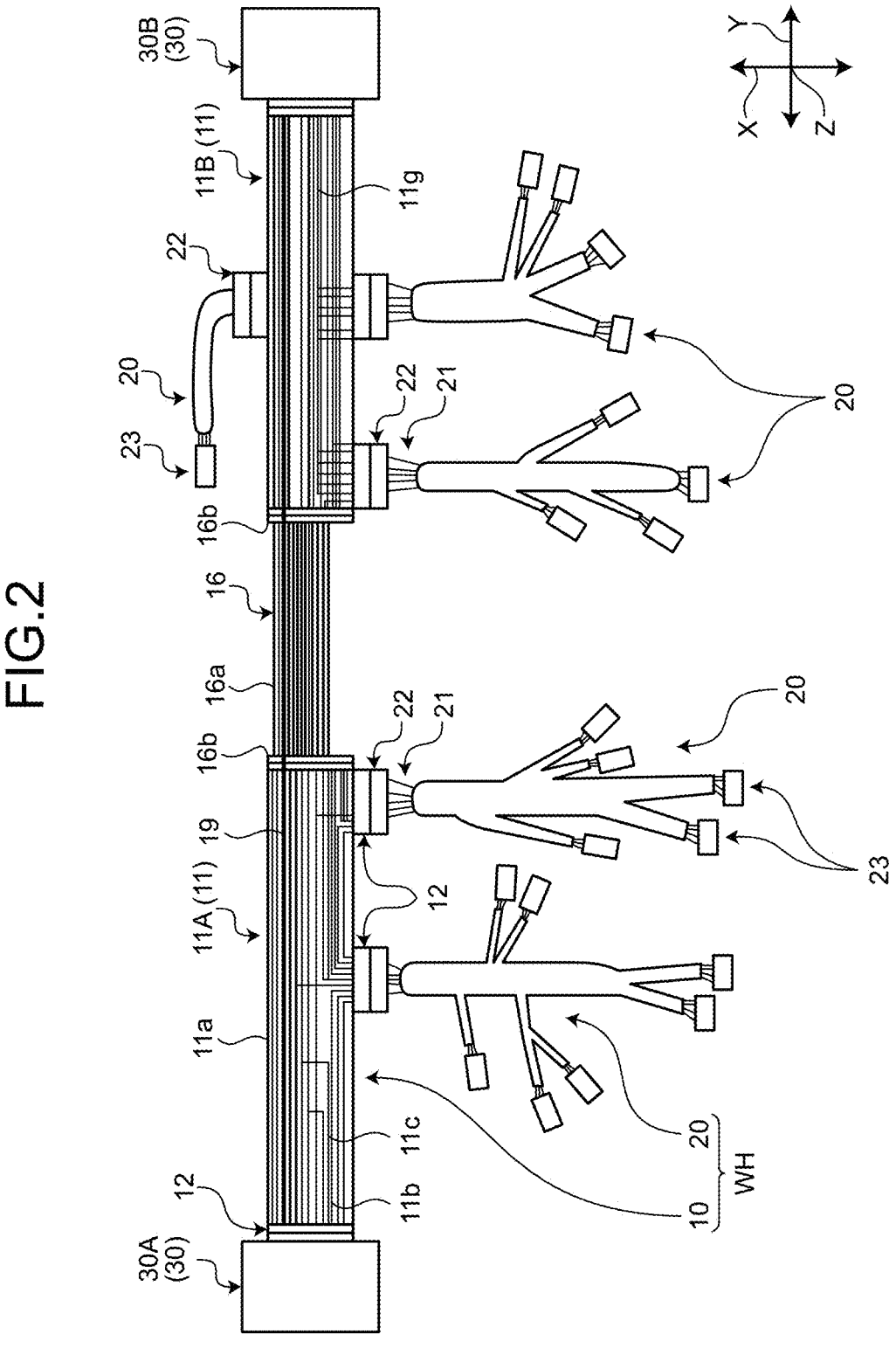
FIG. 2 is an exemplary schematic plan view of the wire harness according to the embodiment.
Figure 3:
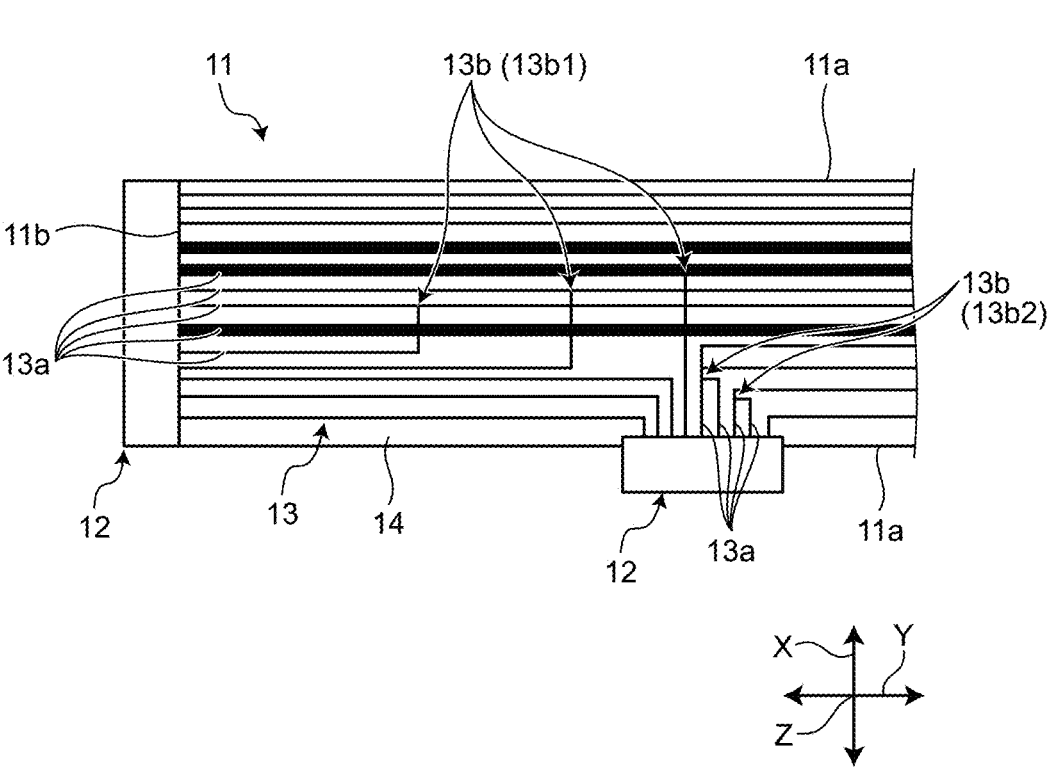
FIG. 3 is an exemplary schematic plan view of a part of one of flexible printed circuit boards of the wire harness according to the embodiment.

FIG. 2 is a schematic plan view of the wire harness WH, and FIG. 3 is a schematic plan view of a part of one of the flexible printed circuit boards 11. As illustrated in FIGS. 2 and 3, the flexible printed circuit board 11 is a thin, flexible printed circuit board, and includes, for example, a wiring pattern 13, a base film 14, and a coverlay. Note that the plurality of flexible printed circuit boards 11, that is, the first flexible printed circuit board 11A and the second flexible printed circuit board 11B have substantially the same configuration (specifications).

The base film 14 is a base material that has excellent flexibility and that defines an overall shape of the flexible printed circuit board 11. The base film 14 is composed of, for example, a polyimide resin or the like having excellent heat resistance. The wiring pattern 13 is stacked on a surface (mounting surface) of the base film 14 to constitute a plurality of conductor circuit portions 13*a* (pattern layer). The wiring pattern 13 is composed of, for example, a conductive material such as copper foil, and is printed on the surface of the base film 14 as a printed circuit body. The coverlay is stacked all over the surface of the base film 14, that is, the base film 14 and the wiring pattern 13, via an adhesive (not illustrated), and functions as a protective layer for protecting the conductor circuit portions 13*a* of the wiring pattern 13 and the like.

In addition, the flexible printed circuit board 11 is formed in a horizontally long rectangular shape in the extending direction Y as a whole. That is, the flexible printed circuit board 11 has a pair of first ends 11*a* as long sides and a pair of second ends 11*b* as short sides. The first ends 11*a* are ends on both sides of the flexible printed circuit board 11 in the depth direction X, and the second ends 11*b* are ends on both sides of the flexible printed circuit board 11 in the extending direction Y. In the present embodiment, at least one of the plurality of trunk connectors 12 is provided at each of the first ends 11*a* and the second ends 11*b* of the flexible printed circuit board 11.

More specifically, the first flexible printed circuit board 11A includes, for example, four trunk connectors 12. Here, two trunk connectors 12 are provided on one of the pair of first ends 11*a* in the extending direction Y with a gap provided therebetween, and one trunk connector 12 is provided on each of the pair of second ends 11*b*. Two of these trunk connectors 12 are connected to branch modules 20 via branch connectors 22, another of the trunk connectors 12 is connected to the first ECU 30A via the connector of the first ECU 30A, and the remaining one trunk connector 12 is connected to the first wiring member module 16 via the trunk first connector 16*b*.

In addition, the second flexible printed circuit board 11B includes, for example, five trunk connectors 12. Here, two trunk connectors 12 are provided on one of the pair of first ends 11*a* in the extending direction Y with a gap provided therebetween, one trunk connector 12 is provided on the other first end 11*a*, and one trunk connector 12 is provided on each of the pair of second ends 11*b*. Three of these trunk connectors 12 are connected to branch modules 20 via branch connectors 22, another of the trunk connectors 12 is connected to the second ECU 30B via the connector of the second ECU 30B, and the remaining one trunk connector 12 is connected to the first wiring member module 16 via the trunk first connector 16*b*. Note that specifications of the trunk connectors 12 including the number of poles, arrangement of the trunk connectors 12, and the like can be appropriately changed in accordance with an attachment position of the wire harness WH in the vehicle 100.

In addition, the plurality of trunk connectors 12 is electrically connected to the wiring patterns 13 of the first flexible printed circuit board 11A and the second flexible printed circuit board 11B. The plurality of conductor circuit portions 13*a* constituted by each wiring pattern 13 can function as a circuit such as a signal circuit, a signal GND circuit, or a power ground circuit. The signal circuit is, for example, a circuit that transmits communication signals between the ECUs 30 and onboard devices such as the various electronic devices 40 in the vehicle 100. The signal GND circuit is a circuit that is electrically connected between the onboard devices along with the signal circuit and that adjusts, between the onboard devices, a potential serving as a reference of circuit operations. The power ground circuit is a circuit that grounds a power supply system of the onboard devices.

Here, in the present embodiment, each wiring pattern 13 is provided with joint portions 13*b* (refer to FIG. 3) that each connect at least two of the plurality of conductor circuit portions 13*a* to each other. The joint portions 13*b* are formed, for example, at the same time as the plurality of conductor circuit portions 13*a* when the wiring pattern 13 is printed, and connect the above-described signal circuits, signal GND circuits, power ground circuits, and the like to each other. Each joint portion 13*b* mutually connects at least two conductor circuit portions 13*a* located in the same one of a plurality of pattern layers constituting the wiring pattern 13. In the present embodiment, each wiring pattern 13 is provided with a plurality of joint portions 13*b*, and branch portions in the entire wire harness WH are concentrated in the joint portions 13*b* on the flexible printed circuit board 11. That is, the joint portions 13*b* include joint portions 13*b*1 having a joint function that can be provided for the ECU 30 (the first ECU 30A or the second ECU 30B) and joint portions 13*b*2 having a joint function that can be provided for the branch modules 20.

Figure 4:
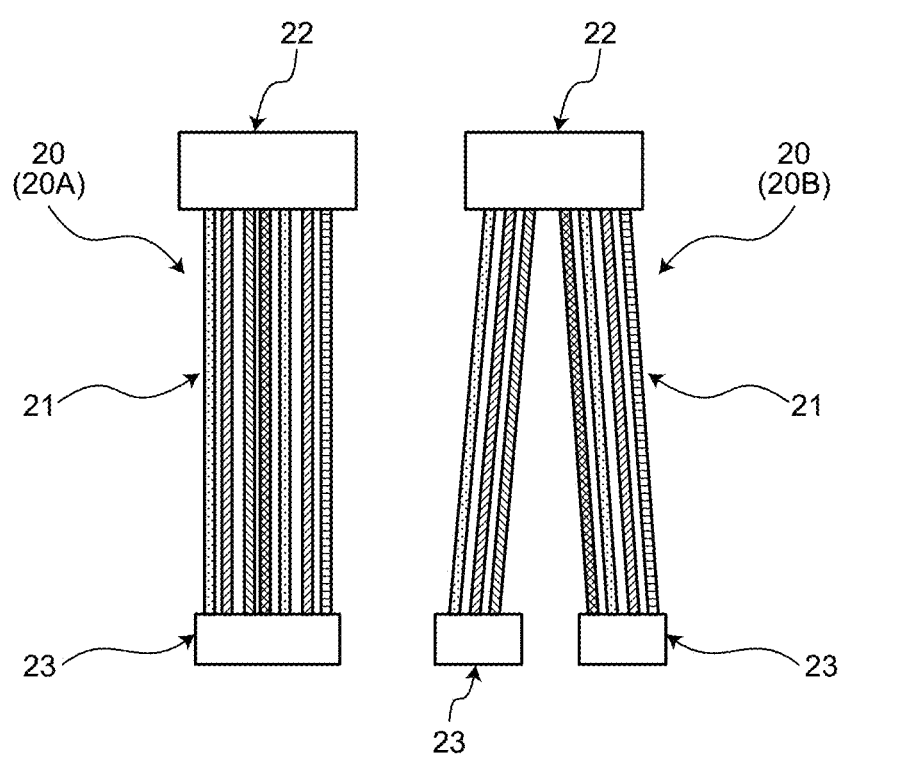
FIG. 4 is an exemplary schematic plan view of a branch module of the wire harness according to the embodiment.

FIG. 4 is a schematic plan view of the branch modules 20. As illustrated in FIG. 4, the branch modules 20 include, for example, I-shaped first branch modules 20A, V-shaped second branch modules 20B, and the like. The first branch module 20A is a branch module 20 where the number of branch connectors 22 provided at one ends of a plurality of branch wiring members 21 is the same as the number of branch connectors 23 provided at other ends of the plurality of branch wiring members 21, that is, the branch connectors 22 and the branch connectors 23 are in a one-to-one relationship. The second branch module 20B, on the other hand, is a branch module 20 where a plurality of branch connectors 23 is provided for one branch connector 22, that is, the branch connector 22 and the branch connectors 23 are in one-to-plural relationship. Here, the second branch module 20B is provided with two branch connectors 23. Note that the number of the branch connectors 23 of the second branch module 20B is not limited to this example, and may be, for example, three or more, instead.

Such a first branch module 20A and a second branch module 20B are branch modules 20 that can be manufactured through automation. That is, in the first branch module 20A, all the branch wiring members 21 constituting the first branch module 20A extend, without branches (joint portions), between the branch connector 22 provided at one ends and the branch connector 23 provided at other ends. Similarly, in the second branch module 20B, all the branch wiring members 21 constituting the second branch module 20B extend, without branches (joint portions), between the branch connector 22 and the two branch connectors 23. As compared with a case where joint portions are provided in a branch module 20, therefore, configuration of the branch module 20 can be simplified, and ease of assembly to the vehicle 100 or the like can be improved.

In addition, since the joint portions 13*b* are provided in the flexible printed circuit boards 11 in the present embodiment, there is also an advantage that the configuration of the ECU 30 can be further simplified. More specifically, in a case where the ECU 30 has a joint function, there are many circuits in the ECU 30, and there is a possibility that the number of poles (connection connectors) between the ECU 30 and the trunk connectors 12 increases or product numbers of the ECU 30 increases. In this regard, according to the present embodiment, since the joint portions 13*b* are provided for the trunk module 10, the configuration of the ECU 30 can be further simplified. Furthermore, the number of poles (connection connectors) between the ECU 30 and the trunk connectors 12 can be reduced, and product numbers of the ECU 30 can be reduced.

In addition, in the present embodiment, the trunk module 10 of the wire harness WH includes the plurality of flexible printed circuit boards 11. The trunk module 10 achieved by the plurality of flexible printed circuit boards 11, therefore, is reduced in weight as compared with a trunk obtained by bundling together various ordinary electrical wires. Here, in a case where the wire harness WH is installed in the vehicle 100, it is also assumed that length of the trunk module 10 is about 1000 mm, and if the trunk having such a length is achieved by electric wires alone, weight of the trunk itself and the entire wire harness WH might increase. In this regard, according to the present embodiment, since the trunk module 10 is configured to include the plurality of flexible printed circuit boards 11, it is possible to cope with an increase in size of the wire harness WH while suppressing an increase in the weight of the entirety of the trunk module 10 or the wire harness WH.

In addition, when the wire harness WH is set in the instrument panel 110 of the vehicle 100, the wire harness WH includes many branch modules 20 corresponding to the various electronic devices 40 including meters, air conditioners, and audio equipment and is heavier than the wire harness WH attached to another part of the vehicle 100. In addition, in such a large wire harness WH, some branch modules 20 might include connectors, such as joint connectors, that are not actually used. In the wire harness WH according to the present embodiment, on the other hand, since the appropriate branch modules 20 including only the necessary branch connectors 22 and 23 can be connected, configuration of the branch modules 20 can be further simplified, and an increase in the weight of the entire wire harness WH can be suppressed.

In addition, in general, in a large wire harness WH including a trunk module 10 in which various electrical wires are bundled together, it may be structurally difficult to employ thin branch wiring members 21 having an allowable current of about several mA as branch modules 20 in some cases. In the present embodiment, on the other hand, since the trunk module 10 is achieved by the plurality of flexible printed circuit boards 11 including generally thin, fine wiring patterns 13, there is also an advantage that it is easy to employ a structure where the branch modules 20 including the thin branch wiring members 21 defined by the above-described current range are connected.

In addition, in general, a wire harness WH including a trunk module 10 where various electrical wires are bundled together is manually manufactured by a worker. Since the flexible printed circuit boards 11 can be manufactured through automation, on the other hand, the number of manufacturing steps of the trunk module 10 can be reduced by achieving the trunk module 10 with the flexible printed circuit boards 11, and as a result, the number of manufacturing steps of the wire harness WH can be reduced.

In addition, since the branch modules 20 are connected to the trunk module 10 via the branch connectors 22 in the present embodiment, the branch modules 20 can be attached to and detached from the trunk module 10. In a final step of the manufacture of the wire harness WH, therefore, the worker only needs to simply connect the plurality of branch modules 20 prepared in advance to the trunk module 10. For example, the worker can assemble the entire wire harness WH by first attaching the trunk module 10, to which the branch modules 20 have not been connected, to the structural member 111 and then connecting the individual branch modules 20 to the trunk module 10. That is, this can also contribute to reducing the number of steps for designing the wire harness WH and facilitating manufacturing work of the vehicle 100 that employs the wire harness WH.

In addition, with the trunk module 10 and the wire harness WH according to the present embodiment, only the branch modules 20 can be replaced for one trunk module 10. When an inconvenience occurs in one branch module 20, therefore, only the branch module 20 can be easily replaced. By sharing the trunk module 10 and appropriately changing only desired branch modules 20, on the other hand, various wire harnesses WH having different types or lengths of branch modules 20 to be employed can be easily achieved. Furthermore, it is possible to execute an extended function as a so-called add-on by which a function that has not been set in the wire harness WH at a time of assembly to the vehicle 100 is newly added after the assembly. Note that when the trunk module 10 constituted by the flexible printed circuit boards 11 is attached to the structural member 111, the trunk module 10 may be attached via a protector for covering and protecting the entire trunk module 10.

In addition, since the branch modules 20 can be attached to and detached from the trunk module 10, there is also an advantage that the trunk module 10 and the plurality of branch modules 20 can be managed with unique product numbers. For example, as a comparative example, when there is a plurality of general wire harnesses WH in which only length of a certain branch module 20 is different, the plurality of wire harnesses WH is managed with different product numbers. With the wire harness WH according to the present embodiment, on the other hand, a product number is assigned to each of the branch modules 20 having different lengths, and the common trunk module 10 is managed with one product number. This, therefore, makes it possible to easily increase variations in the change of the branch module 20 and contributes to simplification of management of the number of steps accompanying a change in the configuration of the wire harness WH.

In addition, in general, a large wire harness WH including the trunk module 10 in which various electrical wires are bundled together has difficulty in transportation due to weight thereof. With the wire harness WH according to the present embodiment, on the other hand, since the trunk module 10 and the branch modules 20 can be separately transported, there is also an advantage that, for example, the number of days taken to manufacture the wire harness WH itself or the vehicle 100 provided with the wire harness WH is shortened and a manufacturing site is hardly limited. In addition, with the wire harness WH according to the present embodiment, since the branch modules 20 can be manufactured independently of the trunk module 10, the branch modules 20 may be manufactured by an automatic machine instead of through manual work by a worker. That is, with the wire harness WH according to the present embodiment, both the trunk module 10 achieved by the flexible printed circuit boards 11 and the branch modules 20 achieved by the branch wiring members 21, that is, the entire wire harness WH, can be manufactured by an automatic machine, which is advantageous, for example, for reducing costs.

In addition, since the flexible printed circuit boards 11 have flexibility in the present embodiment, the trunk module 10 and the wire harness WH are easily adapted to various mounting positions in the vehicle 100. In addition, since one or more trunk connectors 12 are installed at each of the first end 11*a* and the second end 11*b* in the present embodiment, the trunk module 10 can connect the plurality of branch modules 20 from opposite sides. In a case where such a wire harness WH is installed in the vehicle 100, therefore, the trunk module 10 can increase the number of branch modules 20 that can be connected and variations in the configuration of the wire harness WH.

As described above, in the wire harness WH according to the present embodiment, each of the plurality of flexible printed circuit boards 11 is provided with the wiring pattern 13 including the plurality of conductor circuit portions 13a that is electrically connected to the plurality of branch wiring members 21, respectively (that is, in a one-to-one relationship), via the trunk connectors 12 and the branch connectors 22 to constitute transmission paths and the joint portions 13b that each connect at least two of the plurality of conductor circuit portions 13a to each other. With this configuration, for example, the wire harness WH can further simplify the configuration of the branch modules 20 with the joint portions 13b provided for the trunk module 10. That is, the branch portions in the entire wire harness WH can be concentrated in the joint portions 13b on the plurality of flexible printed circuit boards 11. As a result, the wire harness WH can improve the ease of assembly to the vehicle 100 or the like.

Here, if the trunk module 10 is achieved in the wire harness WH by one elongated flexible printed circuit board 11 extending along the extending direction Y, labor and cost required for manufacturing the wire harness WH might increase. In this regard, according to the present embodiment, since the trunk module 10 is configured to include the plurality of flexible printed circuit boards 11 and the first wiring member module 16 that connects the plurality of flexible printed circuit boards 11 to each other, it is possible to suppress lengthening of each flexible printed circuit board 11. The labor, the cost, and the like required for manufacturing the wire harness WH, therefore, can be reduced. In addition, since the trunk module 10 can be folded, for example, at the portions of the first wiring member module 16 at which the plurality of flexible printed circuit boards 11 is connected, it is possible to improve a packing property, a transportation property, and the like of the wire harness WH.

In addition, in the wire harness WH according to the present embodiment, the plurality of flexible printed circuit boards 11 is provided along the extending direction Y of the trunk module 10 with a gap provided therebetween, and the plurality of branch modules 20 is routed toward the electronic devices 40 disposed separate from the plurality of flexible printed circuit boards 11 in the height direction Z, which intersects the extending direction Y. With this configuration, the wire harness WH can more efficiently dispose, for example, the plurality of flexible printed circuit boards 11 and the plurality of branch modules 20 and suppress an increase in the overall weight of the wire harness WH, an increase in the size of the wire harness WH, and the like.

In addition, in the wire harness WH according to the present embodiment, the plurality of flexible printed circuit boards 11 includes the first flexible printed circuit board 11A provided at one end of the trunk module 10 in the extending direction Y and connected to the first ECU 30A via one of the trunk connectors 12 and the second flexible printed circuit board 11B provided at the other end of the trunk module 10 in the extending direction Y and connected to the second ECU 30B via the other trunk connector 12. With this configuration, in the wire harness WH, for example, the first flexible printed circuit board 11A and the second flexible printed circuit board 11B can further simplify configuration of the first ECU 30A and the second ECU 30B and further reduce height of the first ECU 30A and the second ECU 30B.

In addition, in the wire harness WH according to the present embodiment, the first flexible printed circuit board 11A includes the first portion 11c extending along the structural member 111 in the extending direction Y and the second portion 11f connected to the first portion 11c via the plurality of first folded portions 11d and 11e and extending toward the first ECU 30A along the height direction Z, and the second flexible printed circuit board 11B includes the third portion 11g extending along the structural member 111 in the extending direction Y and the fourth portion 11j connected to the third portion 11g via the plurality of second folded portions 11h and 11i and extending toward the second ECU 30B along the height direction Z. With this configuration, for example, the wire harness WH can connect the first flexible printed circuit board 11A and the second flexible printed circuit board 11B disposed on the structural member 111 to each other with the first flexible printed circuit board 11A and the second flexible printed circuit board 11B folded toward the first ECU 30A and the second ECU 30B, respectively.

Modification

Figure 5:
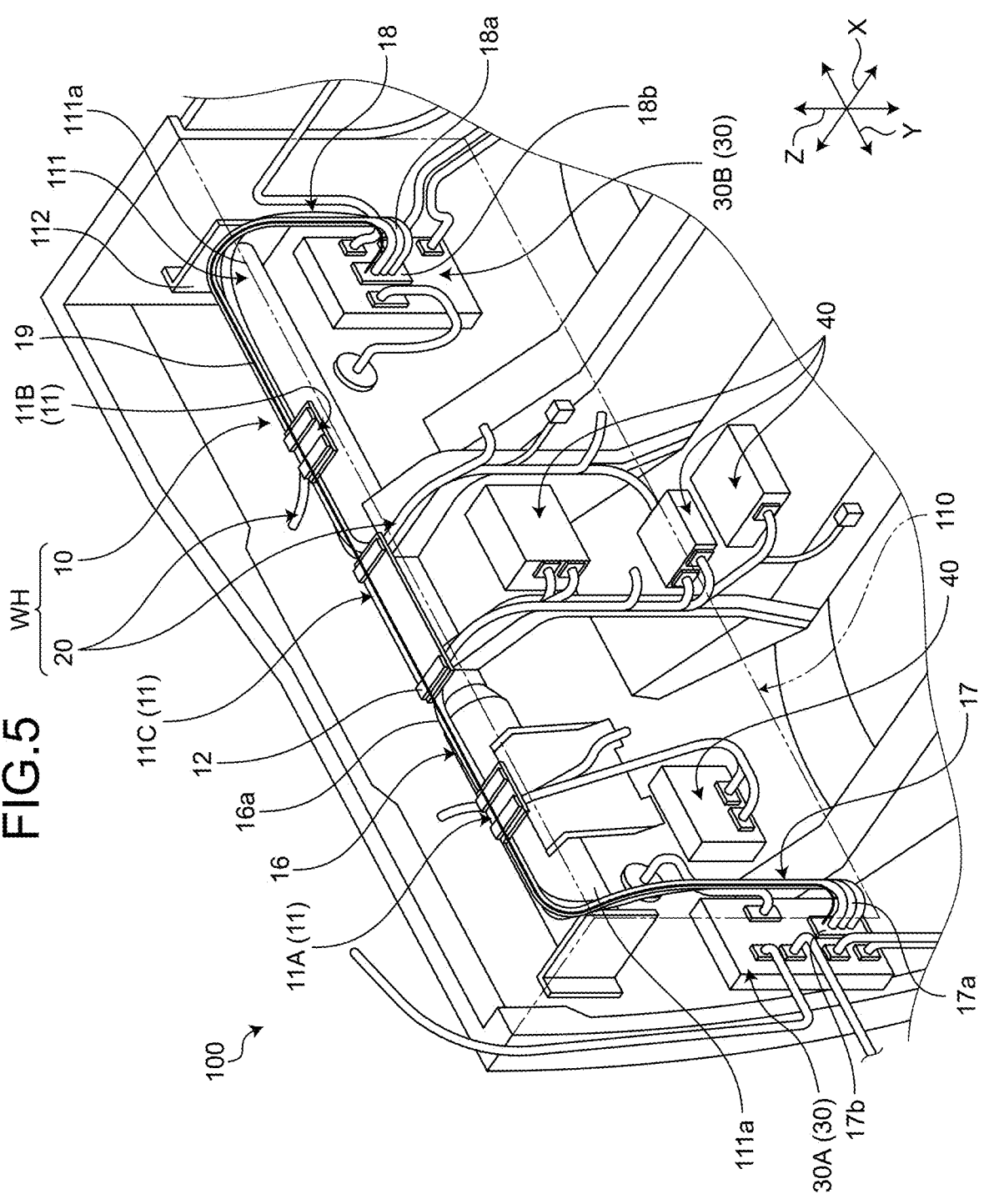
FIG. 5 is an exemplary perspective view of a vehicle for which a wire harness according to a modification is used.
Figure 6:
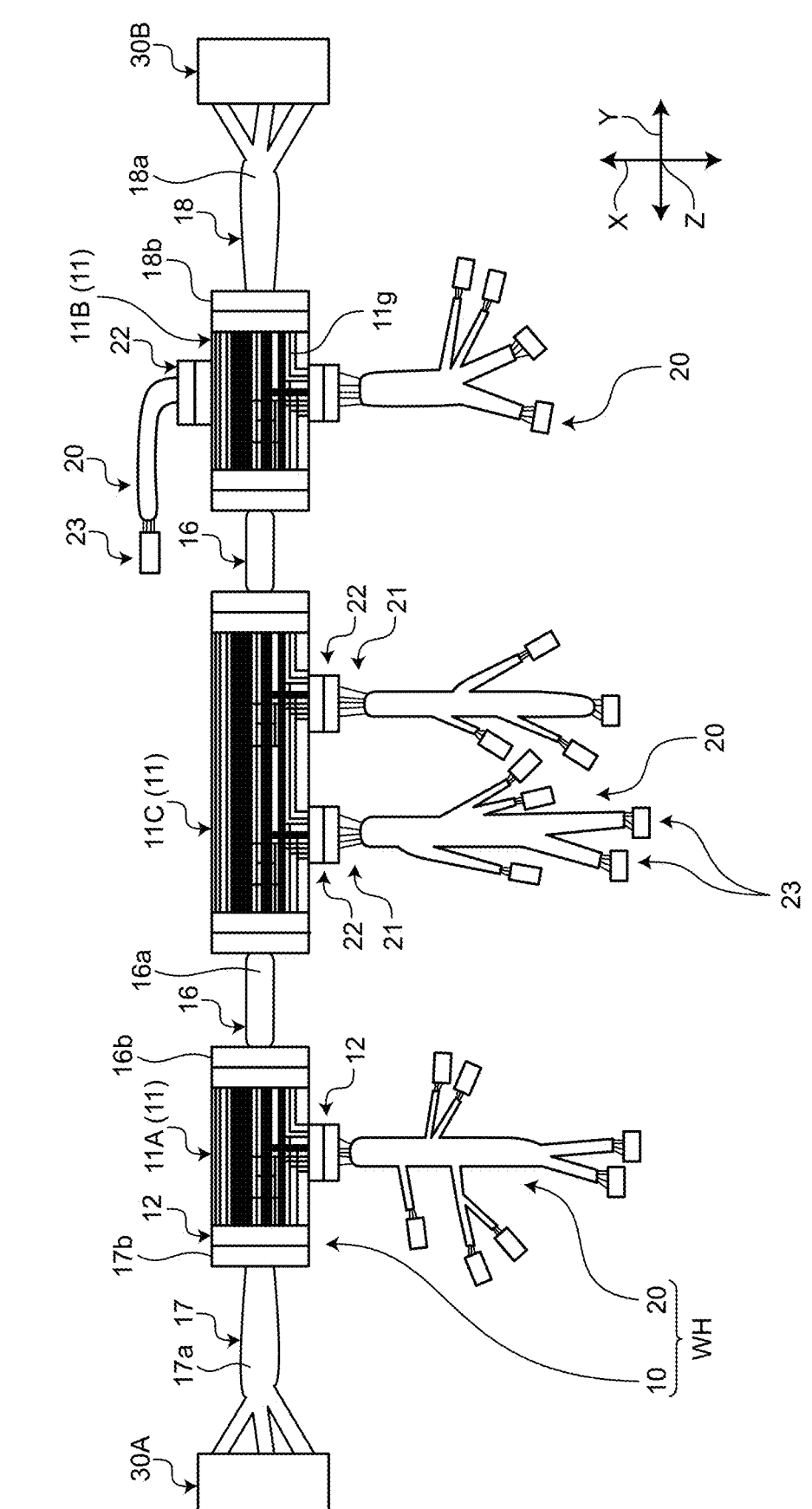
FIG. 6 is an exemplary schematic plan view of the wire harness according to the modification.

FIG. 5 is a perspective view of a vehicle for which a wire harness WH according to a modification is used, and FIG. 6 is a schematic plan view of the wire harness WH according to the modification. The wire harness WH illustrated in FIGS. 5 and 6 has the same configuration as the wire harness WH of the above embodiment. The wire harness WH, therefore, can produce the same actions and effects as those produced by the above embodiment based on a similar configuration.

As illustrated in FIGS. 5 and 6, however, the present modification is different from the above embodiment in that the trunk module 10 includes a first flexible printed circuit board 11A, a second flexible printed circuit board 11B, and a third flexible printed circuit board 11C. The third flexible printed circuit board 11C is provided at a central portion of the trunk module 10 in the extending direction Y, and is electrically connected to each of the first flexible printed circuit board 11A and the second flexible printed circuit board 11B via first wiring member modules 16. In the present modification, length of the third flexible printed circuit board 11C along the extending direction Y is made longer than length of the first flexible printed circuit board 11A and the second flexible printed circuit board 11B along the extending direction Y. In addition, in the present modification, a pair of first wiring member modules 16 is provided on both sides of the third flexible printed circuit board 11C in the extending direction Y.

In the present modification, the first flexible printed circuit board 11A includes, for example, three trunk connectors 12. Here, one trunk connector 12 is provided on one of the pair of first ends 11a, and one trunk connector 12 is provided on each of the pair of second ends 11b. One of these trunk connectors 12 is connected to a branch module 20 via a branch connector 22, another of the trunk connectors 12 is connected to one of the first wiring member modules 16 via the trunk first connector 16b, and the remaining one trunk connector 12 is connected to a second wiring member module 17 via a trunk second connector 17b, which will be described later.

In addition, the second flexible printed circuit board 11B includes, for example, four trunk connectors 12. Here, one trunk connector 12 is provided on each of the pair of first ends 11*a*, and one trunk connector 12 is provided on each of the pair of second ends 11*b*. Two of these trunk connectors 12 are connected to branch modules 20 via branch connectors 22, another of the trunk connectors 12 is connected to one of the first wiring member modules 16 via the trunk first connector 16*b*, and the remaining one trunk connector 12 is connected to a third wiring member module 18 via a trunk third connector 18*b*, which will be described later.

In addition, the third flexible printed circuit board 11C includes, for example, four trunk connectors 12. Here, two trunk connectors 12 are provided on one of the pair of first ends 11*a* in the extending direction Y with a gap provided therebetween, and one trunk connector 12 is provided on each of the pair of second ends 11*b*. Two of these trunk connectors 12 are connected to branch modules 20 via branch connectors 22, and the remaining two trunk connectors 12 are connected to the first wiring member modules 16 via the trunk first connectors 16*b*.

In addition, the plurality of trunk connectors 12 is electrically connected to the wiring patterns 13 of the first flexible printed circuit board 11A, the second flexible printed circuit board 11B, and the third flexible printed circuit board 11C, respectively. The plurality of conductor circuit portions 13*a* (refer to FIG. 3) constituted by each wiring pattern 13 can function as a circuit such as a signal circuit, a signal GND circuit, or a power ground circuit. In the present modification, each of the wiring patterns 13 of the first flexible printed circuit board 11A, the second flexible printed circuit board 11B, and the third flexible printed circuit board 11C is provided with joint portions 13*b* that each connect at least two of the plurality of conductor circuit portions 13*a* to each other.

As illustrated in FIG. 6, the trunk module 10 includes, for example, the second wiring member module 17 and the third wiring member module 18. The second wiring member module 17 is a wiring module including one end connected to the first flexible printed circuit board 11A and another end connected to the first ECU 30A. The second wiring member module 17 includes, for example, a plurality of trunk second wiring members 17*a* having conductivity and a pair of trunk second connectors 17*b* provided at both ends of the plurality of trunk second wiring members 17*a* and electrically connected to the first flexible printed circuit board 11A and the first ECU 30A, respectively. The trunk second wiring members 17*a* are, for example, electric wires each including a conductor portion obtained by intertwining a plurality of linear metal strands and an insulating coating covering the outside of the conductor portion. The second wiring member module 17 is routed from the first flexible printed circuit board 11A disposed on the structural member 111 toward the first ECU 30A disposed separate from the structural member 111 in the height direction Z.

The third wiring member module 18 is a wiring module including one end connected to the second flexible printed circuit board 11B and another end connected to the second ECU 30B. The third wiring member module 18 includes, for example, a plurality of trunk third wiring members 18*a* having conductivity and a pair of trunk third connectors 18*b* provided at both ends of the plurality of trunk third wiring members 18*a* and electrically connected to the second flexible printed circuit board 11B and the second ECU 30B, respectively. The trunk third wiring members 18*a* are, for example, electric wires each including a conductor portion obtained by intertwining a plurality of linear metal strands and an insulating coating covering the outside of the conductor portion. The third wiring member module 18 is routed from the second flexible printed circuit board 11B disposed on the structural member 111 toward the second ECU 30B disposed separate from the structural member 111 in the height direction Z.

As described above, in the wire harness WH according to the present modification, the trunk module 10 includes the second wiring member module 17 and the third wiring member module 18. With this configuration, in the wire harness WH, for example, the first flexible printed circuit board 11A disposed on the structural member 111 and the first ECU 30A disposed separate from the structural member 111 in the height direction Z can be more easily connected to each other by the second wiring member module 17, and the second flexible printed circuit board 11B disposed on the structural member 111 and the second ECU 30B disposed separate from the structural member 111 in the height direction Z can be more easily connected by the third wiring member module 18.

Note that a case where the wire harness WH is used for the vehicle 100 has been described in the above embodiment and modification as an example, but the present invention is not limited to this example, and may be applied to an apparatus, a device, or the like other than the vehicle 100. Even such a wire harness can be easily manufactured like the wire harnesses WH according to the above embodiment and modification.

Although an embodiment and a modification of the present invention have been described above, the embodiment and the modification are merely examples, and are not intended to limit the scope of the invention. The embodiment and the modification may be implemented in various other modes, and various omissions, substitutions, combinations, and changes may be made without departing from the gist of the invention. In addition, specifications (structure, type, direction, form, size, length, width, thickness, height, number, arrangement, position, material, and the like) of each configuration, shape, and the like may be appropriately changed and implemented.

In a wire harness in the present embodiment, each of a plurality of flexible printed circuit boards is provided with a wiring pattern including a plurality of conductor circuit portions that is electrically connected to a plurality of branch wiring members, respectively, via trunk connectors and branch connectors to constitute transmission paths and joint portions each connecting at least two of the plurality of conductor circuit portions to each other. With this configuration of the wire harness, for example, configuration of a branch module can be further simplified by joint portions provided for a trunk module. As a result, the wire harness can improve ease of assembly to a vehicle or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
  a trunk module including a plurality of flexible printed circuit boards having flexibility, a plurality of trunk connectors provided at ends of the plurality of flexible printed circuit boards, and a first wiring member module including a plurality of trunk first wiring members having conductivity and connecting the plurality of flexible printed circuit boards to each other; and
  a plurality of branch modules each including a plurality of branch wiring members having conductivity, and a branch connector provided at ends of the plurality of branch wiring members and connected to one of the trunk connectors, wherein each of the plurality of flexible printed circuit boards is provided with a wiring pattern including a plurality of conductor circuit portions electrically connected to the plurality of branch wiring members, respectively, via the trunk connectors and the branch connectors to constitute transmission paths, and joint portions each connecting at least two of the plurality of conductor circuit portions to each other.

2. The wire harness according to claim 1, wherein the plurality of flexible printed circuit boards is provided along an extending direction of the trunk module with a gap provided therebetween, and the plurality of branch modules is routed toward electronic devices disposed separate from the plurality of flexible printed circuit boards in a direction that intersects the extending direction.

3. The wire harness according to claim 1, wherein the plurality of flexible printed circuit boards includes a first flexible printed circuit board provided at one end of the trunk module in an extending direction and connected to a first ECU via the trunk connector, and a second flexible printed circuit board provided at another end of the trunk module in the extending direction and connected to a second ECU via the trunk connector.

4. The wire harness according to claim 2, wherein the plurality of flexible printed circuit boards includes a first flexible printed circuit board provided at one end of the trunk module in an extending direction and connected to a first ECU via the trunk connector, and a second flexible printed circuit board provided at another end of the trunk module in the extending direction and connected to a second ECU via the trunk connector.

5. The wire harness according to claim 3, wherein the trunk module is disposed on a structural member provided in an instrument panel of a vehicle and extending along the extending direction, the first ECU and the second ECU are disposed separate from both ends of the structural member in the direction intersecting the extending direction, the first flexible printed circuit board includes a first portion extending along the structural member in the extending direction, and a second portion connected to the first portion via a plurality of first folded portions and extending toward the first ECU along the direction intersecting the extending direction, and the second flexible printed circuit board includes a third portion extending along the structural member in the extending direction, and a fourth portion connected to the third portion via a plurality of second folded portions and extending toward the second ECU along the direction intersecting the extending direction.

6. The wire harness according to claim 4, wherein the trunk module is disposed on a structural member provided in an instrument panel of a vehicle and extending along the extending direction, the first ECU and the second ECU are disposed separate from both ends of the structural member in the direction intersecting the extending direction, the first flexible printed circuit board includes a first portion extending along the structural member in the extending direction, and a second portion connected to the first portion via a plurality of first folded portions and extending toward the first ECU along the direction intersecting the extending direction, and the second flexible printed circuit board includes a third portion extending along the structural member in the extending direction, and a fourth portion connected to the third portion via a plurality of second folded portions and extending toward the second ECU along the direction intersecting the extending direction.

7. The wire harness according to claim 3, wherein the trunk module is disposed on a structural member provided in an instrument panel of a vehicle and extending along the extending direction, the first ECU and the second ECU are disposed separate from both ends of the structural member in the direction intersecting the extending direction, and the trunk module includes a second wiring member module including a plurality of trunk second wiring members having conductivity and connecting the first flexible printed circuit board on the structural member and the first ECU to each other, and a third wiring member module including a plurality of trunk third wiring members having conductivity and connecting the second flexible printed circuit board on the structural member and the second ECU to each other.

8. The wire harness according to claim 4, wherein the trunk module is disposed on a structural member provided in an instrument panel of a vehicle and extending along the extending direction, the first ECU and the second ECU are disposed separate from both ends of the structural member in the direction intersecting the extending direction, and the trunk module includes a second wiring member module including a plurality of trunk second wiring members having conductivity and connecting the first flexible printed circuit board on the structural member and the first ECU to each other, and a third wiring member module including a plurality of trunk third wiring members having conductivity and connecting the second flexible printed circuit board on the structural member and the second ECU to each other.

* * * * *